United States Patent
Kim et al.

(10) Patent No.: US 8,936,656 B2
(45) Date of Patent: Jan. 20, 2015

(54) HYDROGEN GENERATOR USING STEAM-REFORMING REACTION

(75) Inventors: Young Dae Kim, Daejeon (KR); Jae Suk Choi, Seoul (KR); Jin Sik Yang, Daejeon (KR); Myung Jun Kim, Seoul (KR)

(73) Assignee: SK Innovation Co., Ltd., Seoul (KR)

( * ) Notice: Subject to any disclaimer, the term of this patent is extended or adjusted under 35 U.S.C. 154(b) by 908 days.

(21) Appl. No.: 13/023,669

(22) Filed: Feb. 9, 2011

(65) Prior Publication Data

US 2011/0194998 A1    Aug. 11, 2011

(30) Foreign Application Priority Data

Feb. 9, 2010    (KR) .................. 10-2010-0011911

(51) Int. Cl.
*B01J 7/00* (2006.01)
*B01J 8/00* (2006.01)
*C01B 3/38* (2006.01)
*B01J 8/06* (2006.01)

(52) U.S. Cl.
CPC ............. *C01B 3/384* (2013.01); *B01J 8/067* (2013.01); *B01J 2208/00221* (2013.01); *B01J 2208/00504* (2013.01); *C01B 2203/0233* (2013.01); *C01B 2203/0816* (2013.01)
USPC ........... 48/61; 48/76; 48/78; 48/75; 48/127.9; 422/625; 422/628; 422/629; 422/649; 422/650; 422/651; 422/652; 422/658

(58) Field of Classification Search
USPC ........... 48/127.9, 127.1, 61, 76, 200; 422/629
See application file for complete search history.

(56) References Cited

U.S. PATENT DOCUMENTS

| | | | | |
|---|---|---|---|---|
| 3,541,729 A | * | 11/1970 | Dantowitz | 48/94 |
| 4,935,037 A | * | 6/1990 | Koyama et al. | 48/94 |
| 5,226,928 A | * | 7/1993 | Makabe et al. | 48/94 |
| 5,639,431 A | * | 6/1997 | Shirasaki et al. | 422/212 |
| 6,458,189 B1 | * | 10/2002 | Edlund et al. | 96/7 |
| 2004/0163311 A1 | * | 8/2004 | Ahmed et al. | 48/127.9 |
| 2008/0090112 A1 | | 4/2008 | Lee et al. | |
| 2008/0096062 A1 | | 4/2008 | Lee et al. | |
| 2008/0244973 A1 | * | 10/2008 | Higashino | 48/127.9 |
| 2010/0254865 A1 | * | 10/2010 | Choi et al. | 422/211 |
| 2011/0044868 A1 | * | 2/2011 | Lee et al. | 422/626 |

FOREIGN PATENT DOCUMENTS

| | | | |
|---|---|---|---|
| EP | 0615949 | A2 | 9/1994 |
| EP | 1245532 | A2 | 10/2002 |
| EP | 1557395 | A2 | 7/2005 |
| EP | 1734002 | A2 | 12/2006 |
| EP | 1767265 | A2 | 3/2007 |
| EP | 1783425 | A1 | 5/2007 |
| WO | 00/22690 | A1 | 4/2000 |

OTHER PUBLICATIONS

European Search Report for EP 11153711.4 dated May 23, 2011.

* cited by examiner

*Primary Examiner* — Kaity Handal
(74) *Attorney, Agent, or Firm* — Abelman, Frayne & Schwab

(57) ABSTRACT

Disclosed herein is a hydrogen generator for producing hydrogen by the steam-reforming reaction of hydrocarbons, in which a pressure loss induction structure for artificially reducing the pressure of exhaust gas is provided between a combustion unit and an exhaust gas discharge pipe, thus improving the uneven distribution of exhaust gas.

5 Claims, 4 Drawing Sheets

HYDROGEN GENERATOR USING STEAM-REFORMING REACTION

CROSS REFERENCE TO RELATED APPLICATION

This application claims the benefit of Korean Patent Application No. 10-2010-0011911, filed Feb. 9, 2010, entitled "Hydrogen generating apparatus using steam reforming reaction with improved distribution of exhaust gas", which is hereby incorporated by reference in its entirety into this application.

BACKGROUND OF THE INVENTION

1. Technical Field

The present invention relates to a hydrogen generator using a steam-reforming reaction, and, more particularly, to a heat exchanger-integrated hydrogen generator for producing hydrogen by a steam-reforming reaction using hydrocarbons as a raw material, in which a pressure loss induction structure for artificially reducing the pressure of exhaust gas is provided between a combustion unit and a exhaust gas discharge pipe, thus improving the uneven heat transfer of the exhaust gas supplied to reactor tubes.

2. Description of the Related Art

Generally, a fuel cell is an electrical generating system for simultaneously generating electricity and heat by converting chemical energy into electric energy by the electrochemical reaction of hydrogen and oxygen.

It is predicted that such a fuel cell will replace an internal combustion engine because it has excellent energy efficiency. Therefore, in the near future, the stable supply of hydrogen will be an essential factor in the use of a fuel cell as a future source of alternative energy.

As methods of supplying hydrogen to a fuel cell, a method of producing hydrogen by electrolyzing water and a method of producing hydrogen by steam-reforming a hydrogen-containing raw material are used.

In this case, all kinds of hydrocarbons, such as natural gas, liquefied petroleum gas (LPG), naphtha, gasoline, kerosene and the like, can be used as the raw material of a steam-reforming reaction. Further, the steam-reforming reaction is conducted at high temperature in the presence of a catalyst.

Therefore, there must be a catalyst in the place in which a steam-reforming reaction takes place, and the heat necessary for the steam-reforming reaction must be supplied thereto.

Conventionally, in order to supply the heat necessary for a steam-reforming reaction, a method of burning fuel to generate heat and then transferring the heat to a hydrogen generator has been used. However, this method is problematic in that efficiency is decreased because heat loss occurs due to the increase in size of an apparatus and the transfer of high-temperature exhaust gas.

Recently, in order to solve the above problem, the inside of a hydrogen generator was divided into two regions, and then one region was used as a steam-reforming region (steam-reforming unit), and the other region was used as a combustion region (combustion unit) for generating the heat necessary for a steam-reforming reaction.

In this case, the catalyst of the steam-reforming unit is mostly located in a catalytic reactor tube having a small diameter, and several catalytic reactor tubes are symmetrically disposed around a heat source depending on the capacity and size of a hydrogen generator.

Further, the heat generated from the combustion unit is transferred to the catalytic reactor tube by the radiation or convection of exhaust gas, and is then used in a steam-reforming reaction.

However, in the heat transfer using exhaust gas, heat cannot be evenly transferred to the catalytic reactor tube because exhaust gas flows unevenly, so that the catalytic reactor tubes are not sufficiently supplied with heat, with the result that a steam-reforming reaction cannot be conducted easily, thereby deteriorating the total performance and efficiency of a reactor. This phenomenon will be described in detail as follows.

Generally, in order to improve thermal efficiency, high-temperature exhaust gas undergoes an exhaust gas recovery process using a heat exchanger several times even after it is discharged from a reformer. For this purpose, exhaust gas gathers at an outlet and is then transferred to a heat exchanger. In this case, exhaust gas moves along the shortest path between a combustor and an outlet. Therefore, as shown in (A) of FIG. 1, a reactor tube which is located relatively far from an outlet does not frequently come into contact with exhaust gas, and thus the amount of the heat transferred from the exhaust gas to the reactor tube decreases.

When heat is unevenly supplied to reactor tubes due to the uneven flow of exhaust gas, there are the following problems. First, when the temperature of some of the reactor tubes does not reach the target temperature, the steam-reforming reaction in the relevant reactor tubes is conducted to a degree lower than the designed value, so that the production of hydrogen decreases and the concentration of unreacted methane in a product increases, thereby directly decreasing the efficiency of a hydrogen generator and increasing the cost for separating a hydrogen purifier necessarily provided at the rear end of a hydrogen generator. Second, when exhaust gas flows unevenly, some of reactor tubes may be heated above their set value, and, when they are exposed to high temperature for a long period of time, a reactor is damaged by the creep of the material of the reactor or by the corrosion of the metal attributable to reformed gas, with the result that the durability of a hydrogen generator decreases. As described above, the uneven distribution of exhaust gas causes the problems of the efficiency of a hydrogen generator being decreased at low temperature and the durability thereof being deteriorated at high temperature. These problems must be solved in order to improve the performance of a hydrogen generator.

SUMMARY OF THE INVENTION

Accordingly, the present invention has been devised to solve the above-mentioned problems attributable to the uneven flow of exhaust gas, and an object of the present invention intends to prevent reactions from being insufficiently conducted in a reactor for lack of heat by supplying an equal amount of heat to each reactor tube.

In order to solve the aforementioned problems, a pressure loss induction structure for inducing exhaust gas in all directions and an exhaust gas collector is provided at the front end of an exhaust gas outlet, and, as shown in (B) of FIG. 1, a structure for evenly discharging exhaust gas in all directions is required.

Therefore, the present invention intends to provide a hydrogen generator having a pressure loss induction structure, by which exhaust gas is evenly distributed and discharged in all directions by an arbitrarily formed partition wall and orifices before the exhaust gas starts from a combustor and then reaches an exhaust gas discharge pipe, so that heat is supplied to all the catalyst tubes in the same amount as a set value, and the hydrogen generator can be easily manufactured and installed and can be stably operated in spite of the thermal deformation attributable to high-temperature exhaust gas.

An aspect of the present invention provides a cylindrical hydrogen generator for producing hydrogen by steam-reforming hydrocarbon materials, including: a reforming unit including a plurality of reactor tubes, each being filled with a catalyst; a combustion unit including a heat source for generating the heat necessary for a steam-reforming reaction in the reactor tubes; and a partition wall radially provided therein with orifices such that exhaust gas can be evenly distributed in all directions by artificially inducing the exhaust gas generated from the combustion unit and artificially regulating the pressure of the exhaust gas between the combustion unit and an exhaust gas discharge pipe.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the attached drawings.

Figure 2:
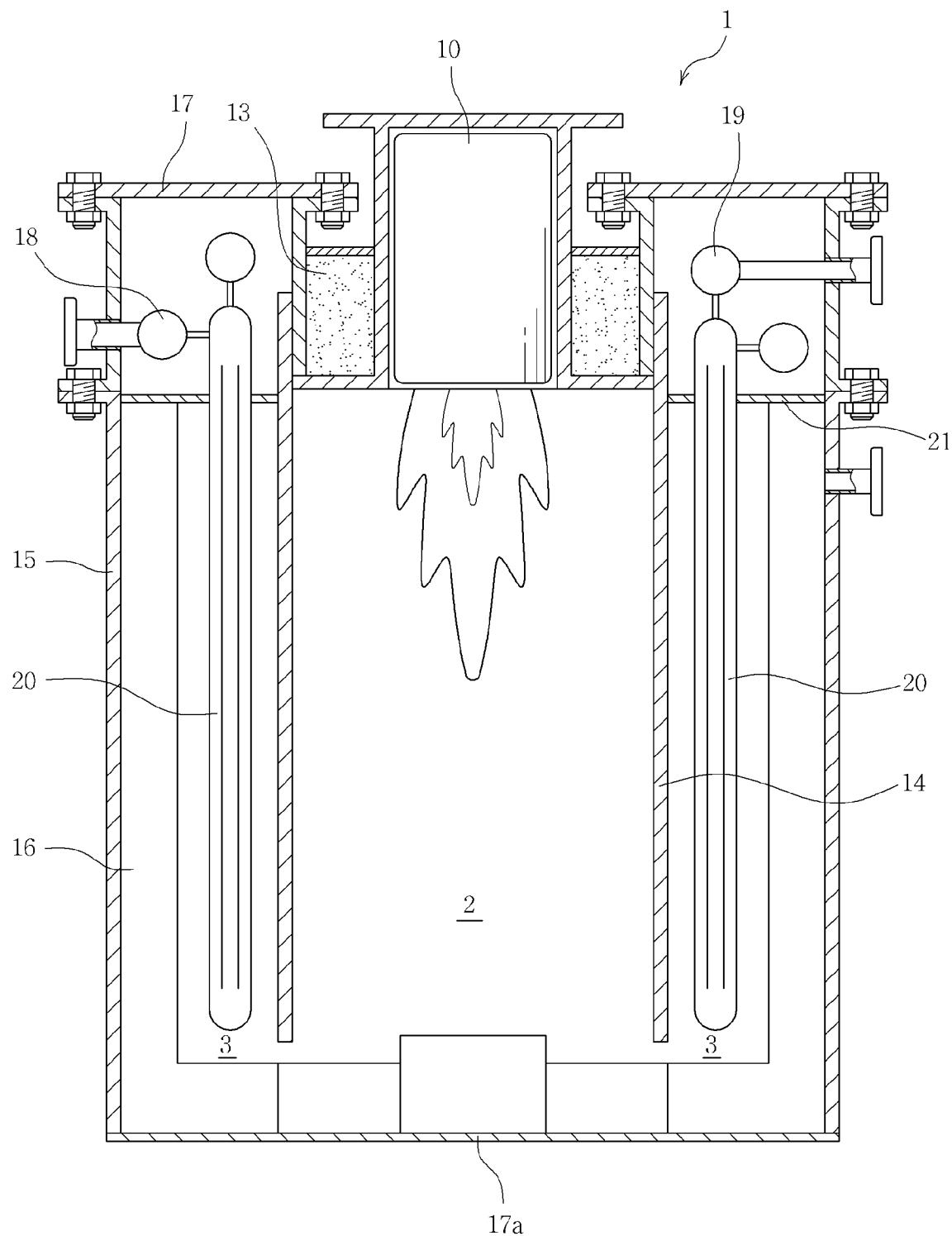
FIG. 2 is a sectional view showing a conventional hydrogen generator.

FIG. 2 is a sectional view showing a conventional hydrogen generator which is applied to the present invention. The conventional hydrogen generator is a heat exchanger-integrated hydrogen generator including reactor tubes, each being filled with a catalyst, a combustion unit and the like. The present invention relates to a cylindrical hydrogen generator including: a combustion unit; and a reforming unit including two or more tubular reformers supplied with the heat necessary for a steam-reforming reaction by the exhaust gas generated from the combustion unit. Particularly, the present invention provides a cylindrical hydrogen generator having a pressure loss induction structure in which an exhaust gas collecting passage communicating with an exhaust gas discharge pipe is formed by a partition wall along the inner circumference of the cylindrical hydrogen generator, and orifices are radially formed in the partition wall at regular intervals such that exhaust gas is evenly transferred to the exhaust gas collecting passage.

Figure 3:
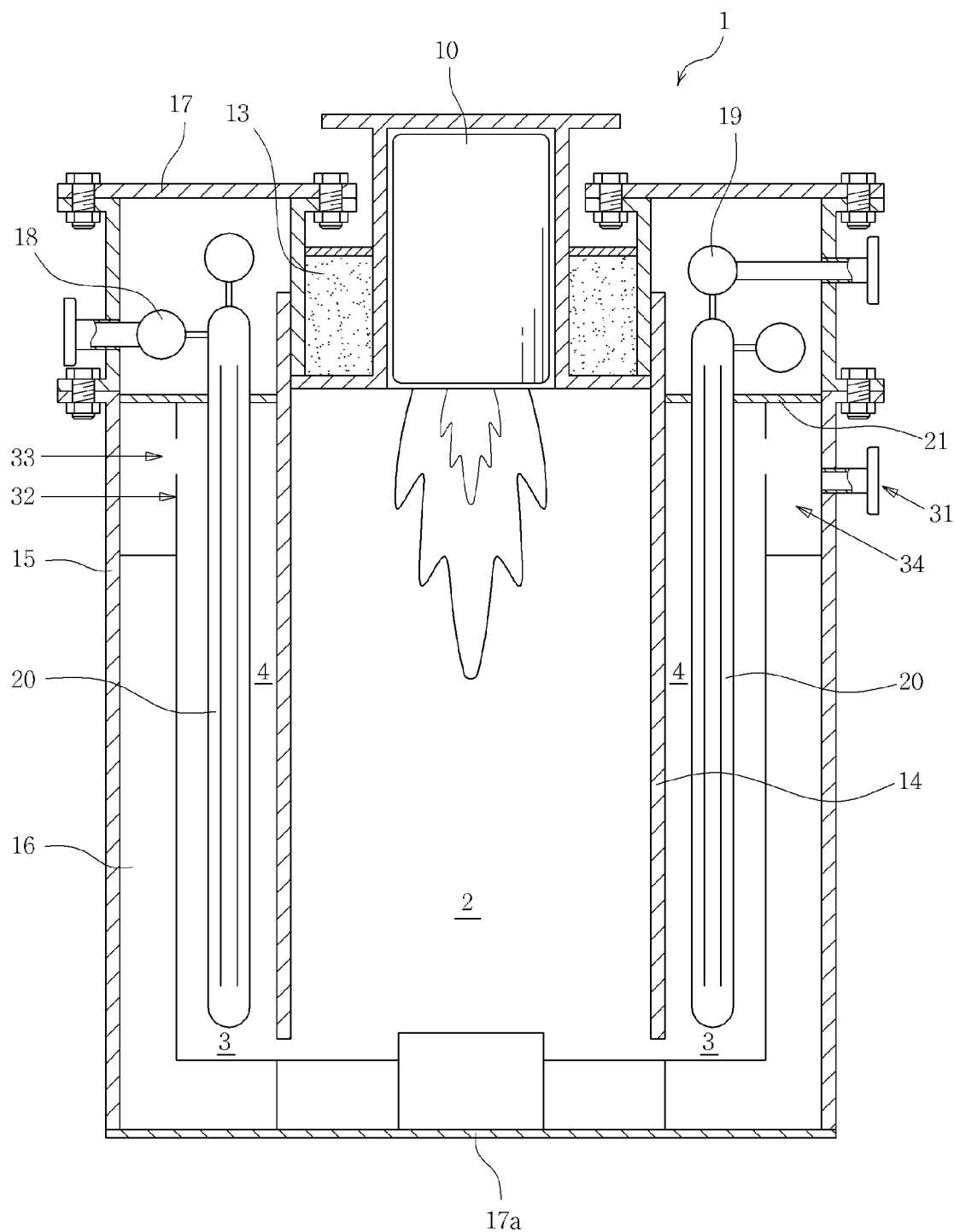
FIG. 3 is a schematic sectional view showing a hydrogen generator having a pressure loss induction structure according to an embodiment of the present invention.

FIG. 3 is a schematic sectional view showing a hydrogen generator having a pressure loss induction structure according to an embodiment of the present invention. As shown in FIG. 3, this hydrogen generator is provided with a partition wall and orifices for pressure regulation such that exhaust gas is discharged in all directions.

Figure 4:
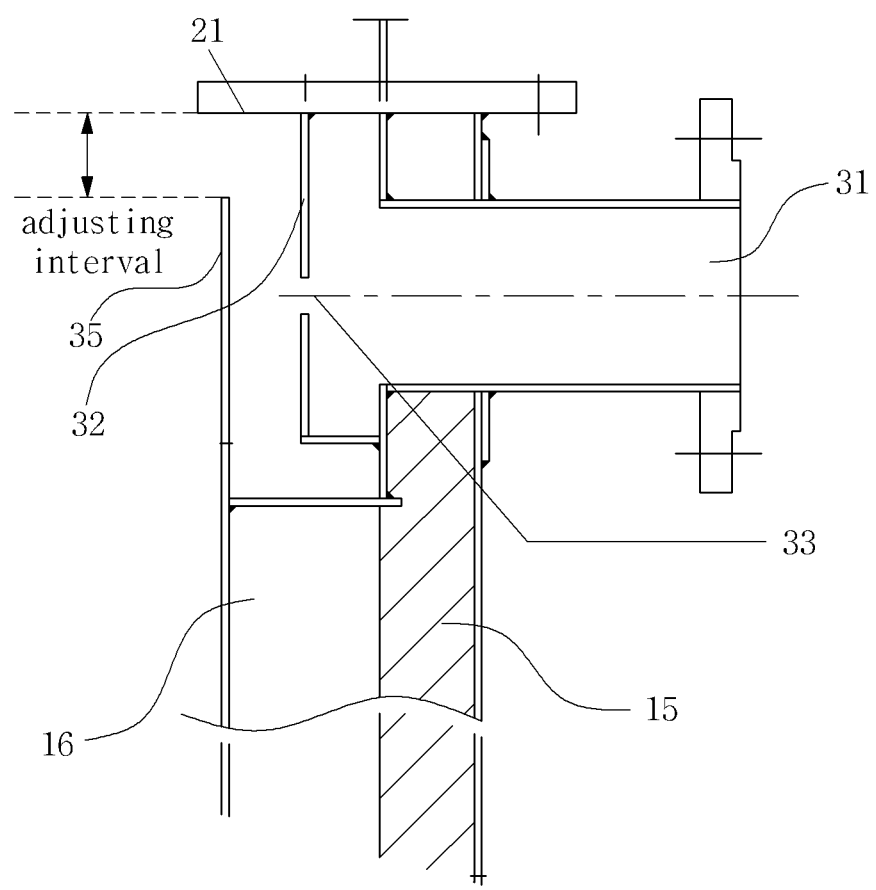
FIG. 4 is a sectional view showing a pressure loss induction structure according to another embodiment of the present invention.

FIG. 4 is a sectional view showing a pressure loss induction structure according to another embodiment of the present invention. As shown in FIG. 4, this pressure loss induction structure is configured such that the cross-sectional area of an exhaust gas passage can be controlled by adjusting the length thereof or providing orifices.

Therefore, as shown in FIGS. 2 and 3, a hydrogen generator 1, which is a basis of the present invention, largely includes a combustion unit 2 provided with a heat source 10, and a reforming unit 3 for reforming hydrocarbon materials using steam.

A burner is used as the heat source 10 provided in the combustion unit 2, but the present invention is not limited thereto. That is, all kinds of heating devices used to generate the heat necessary for a steam-reforming reaction can be used as the heat source 10.

Therefore, the hydrogen generator 1 is provided with the heat source 10 serving to generate the heat necessary for a steam-reforming reaction, and a fireproof material 13 is disposed around the heat source 10, so that high-temperature flames do not directly come into contact with the metal materials constituting the hydrogen generator 1 and simultaneously heat loss is minimized, thereby increasing the efficiency of the hydrogen generator 1.

The hydrogen generator 1 including the fireproof material 13 is provided therein with flame guides 14, and the flame guides 14 divide the inside of the hydrogen generator 1 to form the combustion unit 2 for generating the heat necessary for a steam-reforming reaction. The exhaust gas generated from the combustion unit 2 flows into the reforming unit 3 to transfer the heat necessary for the steam-reforming reaction to the reforming unit 3.

The reforming unit 3, which is formed by dividing the inside of the hydrogen generator 1 using the flame guides 14, is provided therein with a plurality of reactor tubes 20 filled with a catalyst. Hydrocarbon materials are steam-reformed by the action of the catalysts charged in the reactor tubes 20 to produce hydrogen.

Each of the reactor tubes 20 has a cylindrical shape, and its inside is divided into three parts. It is shown in the drawings that each of the reactor tubes 20 is disposed in the reforming unit 3 using an upper connecting plate 21, but the present invention is not limited thereto.

Further, the reactor tubes 20 are cylindrically disposed around the heat source 10 such that heat is efficiently used in a minimum of space.

The hydrogen generator 1 is entirely surrounded by an outer case 15 to protect the hydrogen generator 1 from the external environment. In particular, the inner wall of the external case 15 is provided with an insulating material 16, thus preventing heat loss.

Further, the top and bottom of the hydrogen generator 1 is surrounded by an upper cover 17 and a lower cover 17a, respectively. A dispensing unit for supplying raw materials to the reactor tubes 20 and discharging the hydrogen produced by a steam-reforming reaction is provided under the upper cover 17. The dispensing unit includes raw material dispensers 18 and reformed gas dispensers 19.

Each of the raw material dispensers 18 has a passage through which hydrocarbon materials can move such that the hydrocarbon materials are supplied to the rector tube 20, and each of the reformed gas dispensers 19 has a passage through which hydrogen can move such that the hydrogen produced by a steam-reforming reaction can be easily discharged to the places requiring hydrogen.

Therefore, according to the hydrogen generator 1 as the basis of the present invention configured as above, hydrocarbon materials are supplied to each of the reactor tubes 20 by the raw material dispenser 18, and the heat generated from the heat source 10 provided in the combustion unit 2 is supplied to the reforming unit 3, thus causing mutual heat exchange.

In this procedure, a steam-reforming reaction is induced using the action of steam and a catalyst, and hydrogen is produced in the reactor tubes by this steam-forming reaction. The produced hydrogen is finally discharged to the outside through the reformed gas dispenser 19, and is thus used for fuel cells and the like.

Meanwhile, according to the present invention, in order to allow exhaust gas to evenly transfer heat to each of the reactor tubes 20 and in order to evenly discharge exhaust gas to the outside, a pressure loss induction unit 32 and 33 is provided. The exhaust gas produced from the combustion unit 2 is discharged to the outside through an exhaust gas discharge pipe 31. In the present invention, since the pressure loss induction unit including a partition wall 32 and orifices 33 is provided, the exhaust gas is evenly discharged in all directions, not unevenly discharged in a direction toward the exhaust gas discharge pipe 31. The exhaust gas is collected in an exhaust gas collecting passage 34 and then discharged.

Here, as shown in FIG. 3, the partition wall 32 may be formed by extending the outer wall of the insulating material 16 provided in the hydrogen generator 1. The exhaust gas collecting passage 34 is formed by the partition wall 32 and communicates with the exhaust gas discharge pipe. The exhaust gas collecting passage 34 is configured such that a single space is formed along the circumference of the hydrogen generator of the present invention.

Figure 1A:
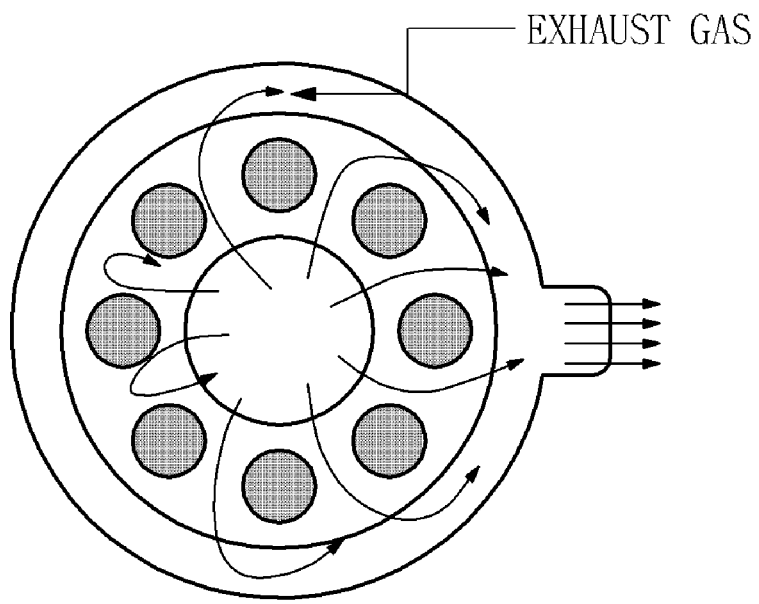
FIG. 1 is a schematic view showing the necessity for the distribution of exhaust gas.
Figure 1B:
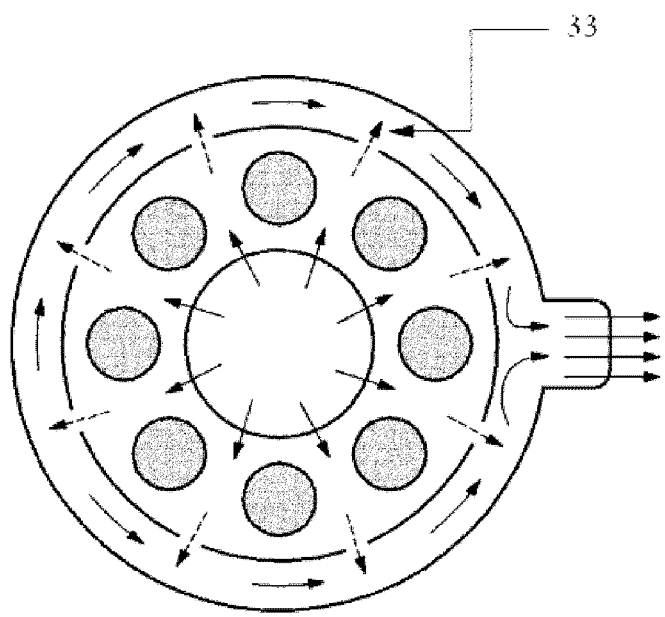

Further, the orifices 33 are formed in the partition wall 32. As shown in (B) of FIG. 1 that is a plan view, the orifices 33 are radially arranged by perforating the partition wall 32 at regular intervals such that exhaust gas is evenly introduced into the exhaust gas collecting passage 34. If necessary, the number of the orifices 33 may be changed. Further, as shown in (B) of FIG. 1, the orifices 33 may be formed between regions of the partition wall 32 that directly face the tubular reactors.

As described above, the direct discharge of exhaust gas, causing the uneven flow of the exhaust gas used as a heat source in the reforming unit 3, can be prevented by means of the partition wall 32 in which the orifices 33 are formed. The orifices 33 also allow the exhaust gas, introduced into the exhaust gas collecting passage 34 as a single communicating passage by the orifices 33, to be easily transferred to the exhaust gas discharge pipe 31.

Here, the pressure loss induction structure may be provided by adjusting the length of the flame guide 14 disposed between the combustion unit 2 and the heat transfer unit 4 or by forming orifices in the flame guide 14 and thus adjusting the area of an exhaust gas passage. In the embodiment of the present invention, the pressure loss induction structure in which orifices are provided between the heat transfer unit 4 and the exhaust gas discharge pipe 31 will be described.

For this purpose, as shown in FIG. 4, the pressure loss structure may be realized by controlling a dimension of the space between the orifices 33 or the partition wall 32 and an outer wall. In particular, the pressure loss structure may be configured such that the guide wall 35 is additionally provided, and thus the exhaust gas passes through the guide wall 35 before it flows into the orifice 33. The guide wall 35, as shown in FIG. 4, may be formed by extending the outer wall of the insulating material 16 surrounding the combustion unit 2. When the pressure loss structure is configured such that exhaust gas passes through the guide wall 35 and then further passes through the orifice 33, the pressure loss of exhaust gas is advantageous compared to when the pressure loss structure is configured such that exhaust gas is directly introduced into the orifice 33.

In order to realize improved distribution efficiency, the pressure loss structure of the present invention must be easily fabricated and disposed, must not be influenced by the thermal deformation attributable to high-temperature operation, and must not influence the pressure loss structure to support the entire reactor structure.

The degree of the pressure loss of exhaust gas must be determined in consideration of the pressure of fuel supplied to the bunter and the loss of pressure in the heat exchanger.

The most preferable example of pressure loss is the case where exhaust gas is discharged at a flow rate of 100-150 kg/hr, and when an orifice having a diameter of 10-15 mm is provided, the pressure of exhaust gas is artificially reduced ($\Delta p = 0.02$ bar), and thus exhaust gas is evenly distributed to the reactor tubes 20.

As described above, according to the present invention, an exhaust gas collecting passage is provided between a combustion unit and an exhaust gas discharge pipe, and a partition wall is provided with an orifice, so that the discharge pressure of exhaust gas is artificially reduced, with the result that the exhaust gas is evenly distributed to reactor tubes cylindrically disposed around a heat source.

Therefore, the deterioration of activity of some reactor tubes due to the uneven distribution of exhaust gas can be prevented, so that the desired reaction efficiency can be accomplished and the stability of a hydrogen generator can be greatly improved.

Further, since the pressure loss structure according to the present invention can be easily fabricated and disposed and is configured such that its performance is not influenced by the thermal deformation attributable to high-temperature operation, the productivity of hydrogen and the convenience of a hydrogen generator can be maintained even when the hydrogen generator has been used for a long time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cylindrical hydrogen generator, comprising:
an outer case, an inner wall of which is provided with a layer of insulating material;
a combustion unit;
a reforming unit including two or more tubular reformers cylindrically disposed around the combustion unit, which is supplied with heat necessary for a steam-reforming reaction through radiation and convection of exhaust gas generated from the combustion unit, the tubular reformers being disposed using an upper connecting plate;
a flame guide which divides an interior region of the hydrogen generator to define the combustion unit;
a pressure loss induction structure in which an exhaust gas collecting passage communicating with an exhaust gas discharge pipe is formed by a partition wall, positioned between the tubular reformers and the outer case, along an inner circumference of the cylindrical hydrogen generator, and a plurality of orifices are radially arranged in the partition wall at regular intervals such that exhaust gas is evenly transferred to the exhaust gas collecting passage; and a guide wall formed to upwardly extend along an outer surface of the layer of insulating material with an interval from the upper connecting plate, wherein the outer surface of the layer of insulating material faces the tubular reformers;

wherein the partition wall is arranged such that the exhaust gas passes between the guide wall and the partition wall before it flows into the orifices.

2. The hydrogen generator according to claim 1, wherein the orifices are located in the partition wall between the tubular reformers and an outer case.

3. The cylindrical hydrogen generator of claim 1, wherein the diameters of the plurality of orifices are in the range of 10 to 15 mm.

4. The cylindrical hydrogen generator of claim 1, wherein the exhaust gas collecting passage is configured to form a single space.

5. The cylindrical hydrogen generator of claim 1, wherein the flame guide is characterized by a first end proximate the combustion unit a second end opposite the combustion unit, and a gap between the second end of the flame guide defining a space open to the reforming unit that provides additional pressure loss induction.

* * * * *